C. E. WIREN.
THERMAL CIRCUIT CLOSER.
APPLICATION FILED APR. 5, 1919.
1,342,317.
Patented June 1, 1920.
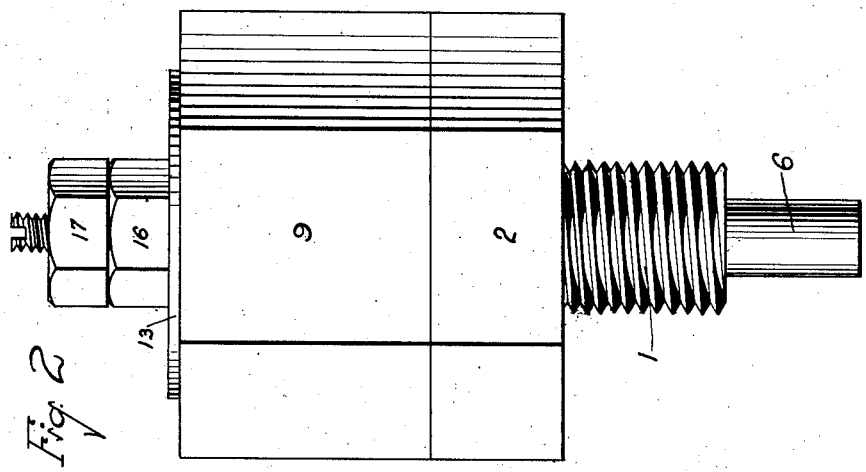
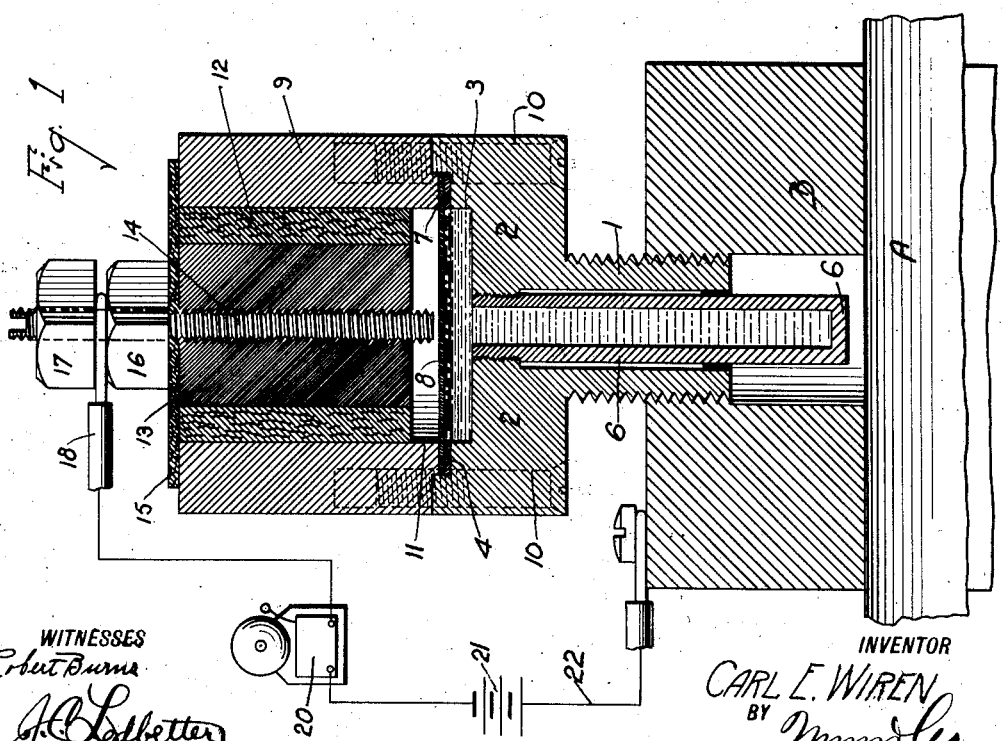
WITNESSES
INVENTOR
CARL E. WIREN
BY
ATTORNEYS

UNITED STATES PATENT OFFICE.

CARL EDVIN WIREN, OF BROOKLYN, NEW YORK.

THERMAL CIRCUIT-CLOSER.

1,342,317.  Specification of Letters Patent.  Patented June 1, 1920.

Application filed April 5, 1919. Serial No. 287,869.

*To all whom it may concern:*

Be it known that I, CARL E. WIREN, a citizen of the United States, and a resident of the city of New York, borough of Brooklyn, county of Kings, and State of New York, have invented a new and Improved Thermal Circuit-Closer, of which the following is a full, clear, and exact description.

This invention relates to a bearing and journal indicating device for protecting the bearing and journal from injury due to over-heating.

A broad object of my invention is to design a bearing and journal indicating and protecting device capable of warning against continuing the operation of a bearing of machinery when said bearing is nearing the danger point of over-heating and approaching the point of destruction due to lack of lubrication, cooling or other attention.

A feature of this invention resides in means for closing an electrical circuit adapted to ring a bell, or light an electric light bulb, or warn against continued operation of a bearing when it becomes overheated.

A further object of the invention resides in a certain expansible circuit closing element, the construction of which is embodied within a substantially inclosed metal casing, the use of which will give an engineer a rugged and everlasting piece of apparatus capable of use in connection with machinery.

With the above and other objects in view the invention has relation to a certain combination and arrangement of parts, an example of which is described in the following specification, pointed out in the appended claims, and illustrated in the accompanying drawings, wherein:

Figure 1 shows a sectional view through the bearing temperature indicator or enunciator, the same being shown attached to a bearing.

Fig. 2 illustrates a side elevational view of the indicator detached from a bearing.

Referring in particular to the drawings, the numeral 1 indicates a screw-threaded stud integrally formed with a base 2. The base is provided with a drilled cavity 3 adapted to hold any appropriate expansible material, such as mercury or alcohol. The base is also provided with a bore 4 which forms an abutment shoulder for receiving an upper coöperating closure head. A tube 6 is screw-threaded into the base and contained within a bore formed in stud 1. This tube is sealed in the lower end thereof and provides a hermetically closed chamber joined with the bores 3 of the base. A packing washer 7 is inserted in the bore 4 and a flexible diaphragm 8 placed upon the packing washer. Any appropriate expansible substance which is subject to volumetric variation due to temperature changes is confined within the chamber formed by the bore in the base and the bore in the tube 6. The packing washer and diaphragm lock the liquid within the chamber.

A head member 9 is provided with a shoulder and placed in clamped engagement with the shoulder formed on the base 2 and securely held in position by screws 10. The head is provided with an internal bore 11. This bore is fitted with a cylindrical insulator tube 12. The insulator tube carries a tight fitting insert plug 13. This plug is screw-threaded and receives a cap-screw or bolt 14. An insulating washer 15 is confined on the cap-screw, in the position illustrated, under a nut 16. A locking nut 17 is employed, and usually a circuit conductor wire 18 will have its terminal inserted between the nuts.

The head member is drawn in clamped relation against the diaphragm and packing washer effectually sealing the liquid within the chamber 3—6. The cap-screw 14 will be screw-threaded into the plug 13 until the lower end of said cap-screw is located adjacent, or very close, to the diaphragm 8, leaving sufficient space therebetween not to contact one member with the other when the temperature of the mercury or other liquid within the expansive chamber is at normal working temperature.

The cap-screw or bolt 14 can be adjusted to set in close position to the diaphragm 8 or farther from said diaphragm. The engineer or other person using this device will adjust screw 14 to the desired relative distance from the diaphragm 8 in such a manner that a relative low temperature will expand the diaphragm 8 against the screw 14 or he may so adjust the screw until it will require a considerable expanding movement of the diaphragm to contact the screw member.

For the purpose of illustrating a form of enunciator or warning signal, the drawings show an electric bell 20 provided with a battery or current supply means 21. The circuit line 18 connects one side of the battery line to the insulated contact screw 14, and a circuit line 22 connects the bell into the other side of the battery line and to the machinery upon which the device is installed. This construction is shown in Fig. 1 where the bell ringing circuit has one side thereof grounded to the bearing cap or other parts adjacent to the journal bearing which the device is adapted to protect. The device is screw-threaded into a tapped bore formed in the bearing in such a manner that the tube 6 will be located in close proximity to the rotating journal A of the bearing box B.

When the journal bearing heats up due to lack of lubrication or other cooling influences the mercury or alcohol will expand the diaphragm against the contact screw thus closing the circuit and ringing the bell. This will inform the engineer in charge that the bearing needs attention and he will immediately be informed so as to save the bearing.

This form of bearing protector may be used on railroad car journals, locomotive journals, in mills and other places where heavy machinery is in use. Where a large number of bearings are to be safe-guarded by using this appliance the enunciator bells or signal lights will be located in the engineer's room and may be correspondingly numbered to indicate each individual bearing. By this arrangement one engineer can keep close watch over a great number of bearings and safe-guard their use, thus obviating the necessity of closing down the machine when the bearing becomes overheated and sticks or is melted out.

The invention is presented to cover the broad range of uses met in the present day industrial plants.

Having thus described my invention, what I claim as new, and desire to secure by Letters-Patent is:

1. A temperature registering device comprising, a base, a threaded stud formed thereon, said stud provided with an internal bore, a tube threaded into the base and confined within the bore of the stud, expansible liquid contained within the tube, a diaphragm disposed across the base to form a liquid compartment, a head held in engagement with the base and provided with an internal bore, an insulating tube contained within the bore of the head, an insert plug fitted into the insulating tube, an insulating washer applied thereto, a contact screw threaded through the insert plug, and lock nuts provided for holding said screw in fixed position.

2. A temperature registering device comprising, a base, a threaded stud integral with the base, said stud provided with a bore, a liquid containing tube fixed in the bore of the stud, a diaphragm disposed across the base to form a liquid compartment, a head having a bore, and placed on the diaphragm, an insert plug contained within the bore of the head, and an adjustable screw mounted in the head to make contact with the diaphragm.

CARL EDVIN WIREN.